Dec. 19, 1967     W. B. ELMER     3,358,553

OPTICAL SYSTEM FOR TAPE PROJECTORS

Filed Feb. 11, 1965     2 Sheets-Sheet 1

INVENTOR
WILLIAM B. ELMER
BY
Kane, Dalimer & Kane
ATTORNEYS

Dec. 19, 1967  W. B. ELMER  3,358,553
OPTICAL SYSTEM FOR TAPE PROJECTORS
Filed Feb. 11, 1965  2 Sheets-Sheet 2

INVENTOR
WILLIAM B. ELMER
BY
Kane, Dalsimer + Kane
ATTORNEYS

United States Patent Office 3,358,553
Patented Dec. 19, 1967

---

3,358,553
OPTICAL SYSTEM FOR TAPE PROJECTORS
William B. Elmer, Grafton County, N.H., assignor to Trans-Lux Corporation, New York, N.Y., a corporation of Delaware
Filed Feb. 11, 1965, Ser. No. 431,886
13 Claims. (Cl. 88—24)

This invention relates to an optical system to be used in the projection of ticker tape to a translucent viewing screen. In particular it relates to an invention in which more efficient utilization of the light source can be made than has been the past practice, and in which a screen of greater length can be utilized.

In the past, tape projection systems have been utilized which project approximately 5½" lengths of tape. The gradually increasing volume of transactions on the stock exchange, however, has brought about an increase in the average speed of ticker tape travel and, consequently, a need for an increase in the length of ticker tape that is visible to the viewer at one time in order that he may have sufficient time for assimilation of the desired information. Projection equipment now in use includes generally units with an incandescent lamp having pre-focused base and "monoplane" filament, a spherical reflector behind the lamp, two spaced apart condensing lenses ahead of the lamp, the ticker tape, a projection lens, and a translucent screen for receiving the image of the tape. Sometimes, 45° plane mirrors are used for convenience and spatially arranging the essential elements. The tape itself is a ¾" wide strip of thin transparent plastic upon which the characters have been printed from the ticker itself.

Since the tape is only ¾" wide, the optical system must not only be able to throw a long, narrow rectangular slit of light, in this instance ¾" x 5½", but, in addition, the rays of light striking the tape through the slit must be directed accurately toward the projection lens in order to be collected and transmitted to the screen.

The existing method of projecting the tape has utilized large lamps of the order of 1,000 watts and been very wasteful of light. When an effort is made to increase the length of tape that is projected to the new 8½" length, an optical system such as is presently used with a 5½" tape would be so wasteful as to create an acute situation. Consequently, a correspondingly higher degree of light control is required. This has necessitated the development of completely new optical systems for ticker tape projections.

In the optical system which is the subject of this invention, the large incandescent pre-focused base lamp has been replaced by a small iodine quartz incandescent lamp, and the spherical reflector replaced by a specially designed one having different conic sections in the two planes at right angles. By such a combination of a more nearly point source light, together with the unique reflector design, it has been possible to solve the problem of expansion of projected lengths of ticker tape and at the same time reduce the power input to the bulb and reduce the excessive heat output of the past systems.

Accordingly, it is an object of this invention to provide such a system which will project longer lengths of tape than have been projected in the past.

It is a further object of the invention to provide such a system which provides cooler projection operation and consequently more ready and less expensive maintenance.

It is an additional object of the invention to provide such a system with a lower power consumption and, consequently, a projector with a lower operating cost.

It is a further object of this invention to provide such a system in which ticker tape projection is accomplished using a reflector having different conic sections in two planes at right angles to the reflector.

Other and further objects of the invention will be apparent in the following description together with the accompanying drawings in which.

Figure 1:
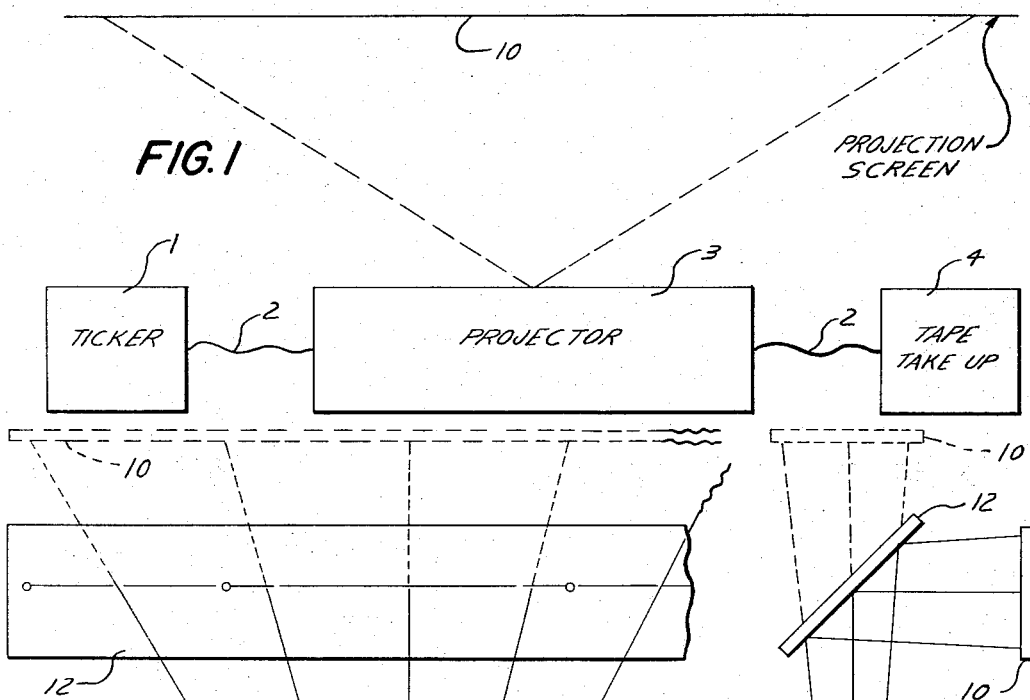
FIG. 1 is a general schematic drawing showing the projection system used for projecting ticker tapes.

Turning to FIG. 1, there is shown a ticker 1 of the new high speed type which is adapted to receive quotations from the various stock exchanges and to print those quotations on a ticker tape 2. Tape 2 leads into projector 3 and thence into tape takeup 4. Projector 3 is shown only in block form in FIG. 1 and will be shown in greater detail in the subsequent drawings herein.

Projector 3 projects the image from the tape 2 to projection screen 10 as shown in FIG. 1.

Figure 2:
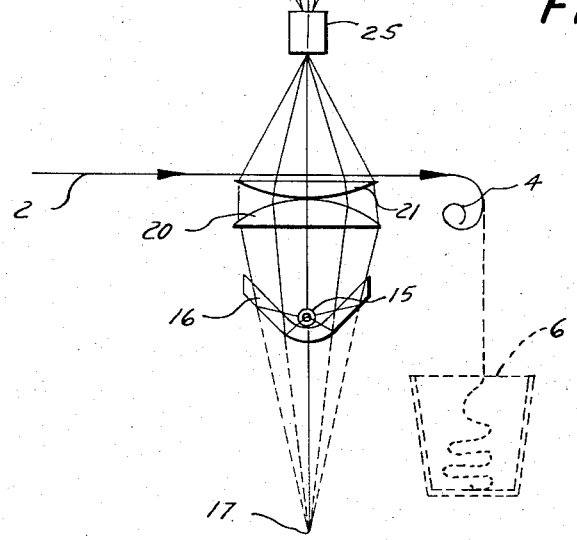
FIG. 2 is an optical drawing showing the reflector and lens systems used in one form of the invention.
Figure 3:
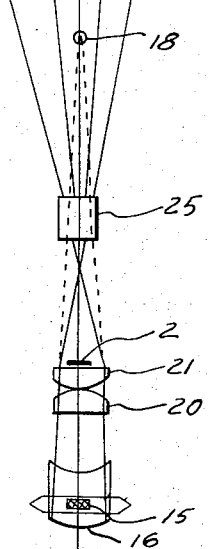
FIG. 3 is a similar drawing taken in a plane at right angles to the drawing of FIG. 2.

FIG. 2 shows the workings of projector 3 in more detail. An incandescent lamp 15 is used as the light source and is positioned in a specially designed reflector 16. This reflector has a hyperbolic center section as shown in the drawing of FIG. 2 with the focus at lamp 15. The sections of the reflector in a transverse plane as shown in FIG. 3 are elliptical.

Lamp 15 is of an iodine quartz construction with a cylindrical coiled tungsten filament enclosed within a relatively small transparent quartz tube. The length of the filament cylinder is made small in relation to the diameter, the length to diameter ratio being held to less than 8 to 1. In a lamp of this type the light flux is strongest at the, "equator" or center plane, of the lamp and weakest at the, "poles" or endwise, of the lamp. The small size of the lamp permits the use of a relatively small reflector arranged close to the lamp and so greatly improved efficiency of utilization of the illumination.

In order to achieve high utilization of light flux, the reflector 16 which substantially envelopes the light source is arranged to accept equatorial light more efficiently than polar light. The basic central curvature of the reflector 16 is a hyperbola which extends about 220° around the lamp, thus receiving nearly two-thirds of the light flux emanating. In its lateral sections, as shown in FIG. 3, the reflector 16 is elliptical. Thus, the reflector is of an elongated, scooped shape which accepts some four or five times the light flux accepted by the small, spherical reflector used in earlier systems.

The hyperbolic central section of reflector 16 has two foci. As stated above, lamp 15 is at one focus. The second focus is behind the reflector and designated by the numeral 17. Thus, the lamp light is collected and redirected into a mildly diverging system of rays directed to condenser 20. The focal length of condenser 20 is the distance to the second focus point 17. Therefore, the rays of the light from the reflector are brought into parallelism by this condenser. The ray system then passes into a second condenser 21 of a focal length such that the rays are concentrated in an objective lens 25.

Ticker tape 2 is directed to pass over the plane surface of condenser 21 as it passes through projector 3. It then proceeds to tape takeup represented by the numeral 4, or may be disposed of as indicated by the dotted configuration 6.

Upon passing through the objective lens, the rays continue to the screen 10 where the image of the tape is formed and the characters made readable. If desired, for purposes of spatial configuration a 45° angle plane reflector 12 may be interposed between the objective 25 and the screen 10.

FIG. 3 shows the optical system of FIG. 2 in a plane transverse to that of FIG. 2. It will be seen that the filament of lamp 15 is longer than its diameter. The effect of such distribution of light source is to require the ray system to converge slightly, rather than diverge, so that maximum utilization of light flux is to be realized. Thus, in the plane of FIG. 3, the two foci are different than in the plane of FIG. 2. One focus is at lamp 15 as with FIG. 2. The other focus, however, is located beyond the objective lens 25 at point 18 in FIG. 3.

To eliminate any irregularities in screen brightness, a diffusing pattern was introduced into the reflector surface which spread the light lengthwise of the reflector, but not crosswise. This diffusion was produced by grooving the metal reflector surface with fine arcuate grooves in the plane of FIG. 3, which grooves were sufficiently wide and deep to even out the screen brightness fully, but not enough to lose efficiency by sending any of the light flux beyond the scope of acceptance of the objective lens.

Thus, it will be seen that in the structures of FIGS. 1, 2, and 3, a reflector is utilized having different conic sections in two planes at right angles to the reflector, i.e., an elliptic section in one plane and the non-elliptic section in the plane at right angles thereto.

Figure 4:
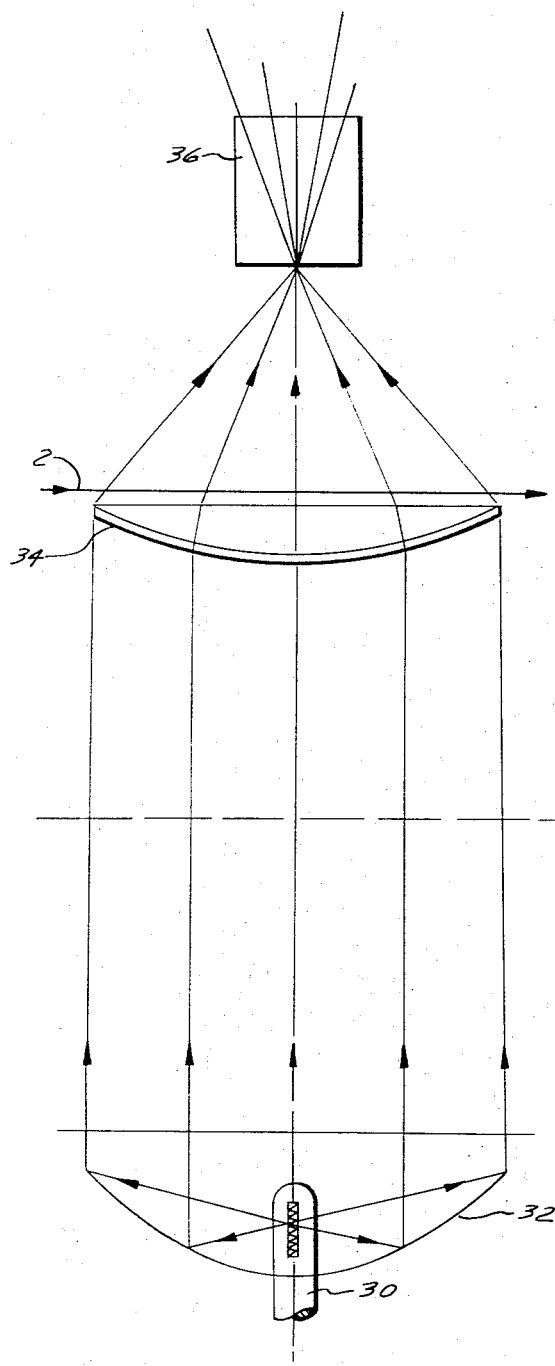
FIG. 4 is an optical drawing showing one modification of the system of the disclosed invention.
Figure 5:
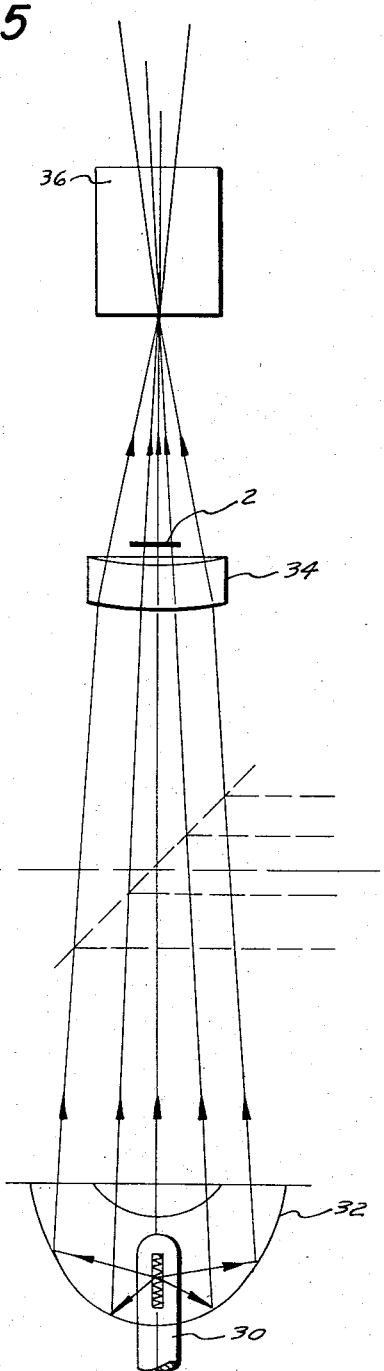
FIG. 5 is a second drawing of the system of FIG. 4 taken in a plane at right angles to the drawing of FIG. 4.

FIGS. 4 and 5 show modification of the disclosed invention which once again utilizes a reflector having a different conic section in transverse planes. Turning to FIG. 4, there is shown therein a projecting lamp 30 mounted centrally of reflector 32 and with the axis of its filament parallel to the axis of the reflector. In the cross-section of FIG. 4, reflector 32 is parabolic in cross-section. In this plane, the light rays from lamp 30 are reflected from reflector 32 and pass parallel to condenser 34 which causes them to cross in objective lens 36. The rays pass through objective lens 36 and on to the screen, not shown in these drawings. As with FIGS. 2 and 3, tape 2 passes just above condenser 34, so that the image is taken from the tape by the objective lens 36 and projected upon the screen.

The section of the reflector 32 in the plane of FIG. 5 is not a parabola as in FIG. 4, but rather an ellipse. This causes the rays to converge slightly as they approach the condenser 34 and cross in front of the lens. Thus a powerful, uniform coverage of the condensing lens is created which in turn condenses the ray system through the ticker tape 2 and thence to the objective lens 36 and eventually to the screen for viewing.

The optical system of FIGS. 4 and 5 serves to create a much greater concentration of light than did the old systems and is preferred for 5½″ lengths of tape. As between the two systems shown here, the system of FIGS. 2 and 3 is the preferred system for the longer tape length.

Though the system of FIGS. 4 and 5 may be used with 8½″ tape, it would require an over-all larger reflector and greater throw distance between reflector and condenser.

It will be clear to those skilled in the art that various modifications of the above-described invention may be made without departing from the spirit of the invention.

Having now described the invention, what is claimed is:

1. An apparatus for producing a light image of indicia imprinted upon a movable tape of the stock ticker type, said apparatus being adapted for projection of the image thereof upon a screen for viewing purposes, an objective lens directed toward the same, means providing a projecting station, an elongated source of light with its long dimension extending substantially parallel to the direction of light throw from the apparatus, a condenser lens interposed between such source and station, a reflector to the rear of such light source, said reflector having curved surface areas of different configurations in planes at right angles to one another, and said areas and condenser lens confinig the effective rays emanating from said light source to a path defining substantially a ribbon of light at said station.

2. The apparatus of claim 1, in which said reflector configuration in one plane is elliptical and said configuration in the other of said planes is non-elliptical.

3. The apparatus of claim 1, in which said reflector configuration in one of said planes is elliptical and said configuration in the other of said planes is hyperbolic.

4. The apparatus of claim 1, in which said reflector configuration in one of said planes is elliptical and said configuration in the other of said planes is parabolic.

5. The apparatus of claim 3, in which said reflector has grooves in its curved surface for diffusion of light rays.

6. The apparatus of claim 4, in which said reflector has grooves in said curved surface areas for diffusion of light rays.

7. In an apparatus for producing on a viewing screen a light image of indicia imprinted upon a tape of a stock ticker type, an elongated source of light, a reflector to the rear of said light source, said reflector having curved surface areas of different configurations in planes at right angles to one another, one of said configurations being elliptical and the other of said configurations being non-elliptical, the light source extending in a direction substantially parallel to the light throw path of the apparatus.

8. The unit of claim 7, in which one of said reflector surface configurations is elliptical and the other of said configurations is hyperbolic.

9. The unit of claim 7, in which one of said reflector surface configurations is elliptical and the other of said configurations is parabolic.

10. The unit of claim 7, in which said reflector has arcuate grooves therein to diffuse said light rays.

11. The combination in a reflecting system which comprises an elongated light source, a reflecting element partially surrounding the light source throughout its length, the reflecting element having two different curvatures, one curvature being substantially hyperbolic in the long plane to provide the main light throw path and the other curvature being substantially elliptical in the narrow plane, and means to support the elongated light source substatnially at the focus of the hyperbolic element so that it thereby extends substantially parallel to the main light throw path.

12. The combination in a reflecting system which comprises an elongated light source, an elongated reflecting element partially surrounding a light source substantially throughout its length, the reflecting element having a non-elliptical curvature in one path and a substantially elliptical curvature in the other path, the non-elliptical curvature being in the direction of the elongated filament and the long direction of the reflector to provide the main light throw path and the other curvature being in the narrow plane, and means to support the light source substantially at the focus point of the non-elliptical element throughout its length.

13. The optical system claimed in claim 12 wherein, for projection purposes, one of the reflector surfaces is provided with arcuate grooves extending lengthwise thereof to diffuse the light rays.

References Cited

UNITED STATES PATENTS

| | | | |
|---|---|---|---|
| 1,977,120 | 10/1934 | Dirkes et al. | 88—24 |
| 2,108,055 | 2/1938 | Eitzen | 88—24 |
| 2,252,246 | 8/1941 | Bergmans et al. | 88—57 |
| 2,415,635 | 2/1947 | Hopkins | 88—24 |
| 2,604,006 | 7/1952 | Hartmann | 88—24 |

NORTON ANSHER, *Primary Examiner.*

V. A. SMITH, R. A. WINTERCORN,
*Assistant Examiners.*

UNITED STATES PATENT OFFICE
CERTIFICATE OF CORRECTION

Patent No. 3,358,553  December 19, 1967

William B. Elmer

It is hereby certified that error appears in the above numbered patent requiring correction and that the said Letters Patent should read as corrected below.

Column 2, line 48, after "reflector", second occurrence, insert -- 16 --; column 4, line 1, for "confinig" read -- confining --; line 5, after "said" insert -- reflector --; lines 9 and 12, before "configuration", each occurrence, insert -- reflector --; line 44, for "substatnially" read -- substantially --.

Signed and sealed this 14th day of January 1969.

(SEAL)
Attest:

Edward M. Fletcher, Jr.
Attesting Officer

EDWARD J. BRENNER
Commissioner of Patents